(12) United States Patent
Fujii et al.

(10) Patent No.: US 12,487,429 B2
(45) Date of Patent: Dec. 2, 2025

(54) IMAGING LENS UNIT AND MANUFACTURING METHOD THEREOF

(71) Applicant: KYOCERA CORPORATION, Kyoto (JP)

(72) Inventors: Takaharu Fujii, Kyoto (JP); Kousuke Sugiki, Kyoto (JP); Satoru Kihara, Kyoto (JP); Takashi Saotome, Kyoto (JP); Daisuke Kanai, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 953 days.

(21) Appl. No.: 17/586,601

(22) Filed: Jan. 27, 2022

(65) Prior Publication Data

US 2022/0146778 A1 May 12, 2022

Related U.S. Application Data

(63) Continuation of application No. PCT/JP2020/029051, filed on Jul. 29, 2020.

(30) Foreign Application Priority Data

Jul. 29, 2019 (JP) ................................. 2019-139018

(51) Int. Cl.
  *G02B 7/02* (2021.01)
  *G03B 17/12* (2021.01)

(52) U.S. Cl.
  CPC ............. *G02B 7/021* (2013.01); *G02B 7/022* (2013.01); *G03B 17/12* (2013.01)

(58) Field of Classification Search
  CPC ........ G02B 7/021; G02B 7/022; G02B 7/026; G03B 17/12
  See application file for complete search history.

(56) References Cited

U.S. PATENT DOCUMENTS

| | | | |
|---|---|---|---|
| 2010/0128367 A1* | 5/2010 | Beckenbach | G02B 7/023 |
| | | | 359/822 |
| 2017/0257533 A1 | 9/2017 | Takama et al. | |
| 2018/0372983 A1* | 12/2018 | Shimizu | G02B 7/021 |

FOREIGN PATENT DOCUMENTS

| CN | 1530683 A | * 9/2004 | ............ G02B 7/026 |
|---|---|---|---|
| JP | 200329115 A | 1/2003 | |
| JP | 200611234 A | 1/2006 | |
| JP | 2006011234 A | * 1/2006 | ......... B29C 65/1635 |
| JP | 201545750 A | 3/2015 | |
| JP | 2015045750 A | * 3/2015 | |
| JP | 2015169916 A | 9/2015 | |
| JP | 6182380 B2 | 8/2017 | |

* cited by examiner

*Primary Examiner* — Bumsuk Won
*Assistant Examiner* — Ray Alexander Dean
(74) *Attorney, Agent, or Firm* — HAUPTMAN HAM, LLP

(57) ABSTRACT

An imaging lens unit includes a resin lens barrel and a plurality of lenses incorporated in the lens barrel. The lens barrel has a lens barrel body and a box-shaped part. A plurality of lens receiving parts are arranged at predetermined intervals in a circumferential direction of the lens barrel body and protrude from an inner peripheral surface of the lens barrel body. The fourth lens is fixed to the lens barrel in a state of being engaged with the plurality of lens receiving parts.

14 Claims, 14 Drawing Sheets

IMAGING LENS UNIT AND MANUFACTURING METHOD THEREOF

CROSS-REFERENCE TO RELATED APPLICATIONS

This application is a Continuation of PCT International Application No. PCT/JP2020/029051 filed on Jul. 29, 2020, which claims priority under 35 U.S.C 119(a) to Japanese Patent Application No. 2019-139018 filed on Jul. 29, 2019, which are hereby entirely incorporated by reference.

BACKGROUND OF THE INVENTION

1. Field of the Invention

The present disclosure relates to an imaging lens unit that can be used in various environments and a method for manufacturing the same.

2. Description of the Related Art

Since an imaging lens unit constituting an in-vehicle camera or the like has a wide range of usage environments, stable performance is desired in a wide temperature range from low temperature to high temperature. In order to achieve stable performance of the imaging lens unit over a wide temperature range, a method of incorporating a lens into a lens barrel is important. For example, there is known a lens unit using a press-fitting method in which an outer diameter of a lens is formed larger than an inner diameter of a lens barrel and pressure is applied to the lens to incorporate the lens into the lens barrel (see JP6182380B2).

SUMMARY OF THE INVENTION

An imaging lens unit of the present disclosure comprises a plurality of imaging lenses and a lens barrel in which the plurality of imaging lenses are incorporated, the lens barrel includes a lens barrel body formed in a cylindrical shape and a plurality of lens receiving parts, and a fixed lens, which is at least one of the plurality of imaging lenses, is engaged with the plurality of lens receiving parts. The lens receiving parts are arranged at predetermined intervals in a circumferential direction of the lens barrel body and protrude from an inner peripheral surface of the lens barrel body.

A manufacturing method of an imaging lens unit of the present disclosure comprises a plurality of imaging lenses and a lens barrel in which the plurality of imaging lenses are incorporated, the manufacturing method includes setting an imaginary circle passing through first surfaces in the plurality of lens receiving parts in the lens barrel, and forming a diameter of the imaginary circle smaller than a diameter of a fixed lens, and press-fitting the fixed lens in parallel with a central axis to make an outer peripheral surface contact with the first surface and to make a plane contact with a second surface, so that the fixed lens is engaged with the plurality of lens receiving parts.

DESCRIPTION OF THE PREFERRED EMBODIMENTS

Figure 1:
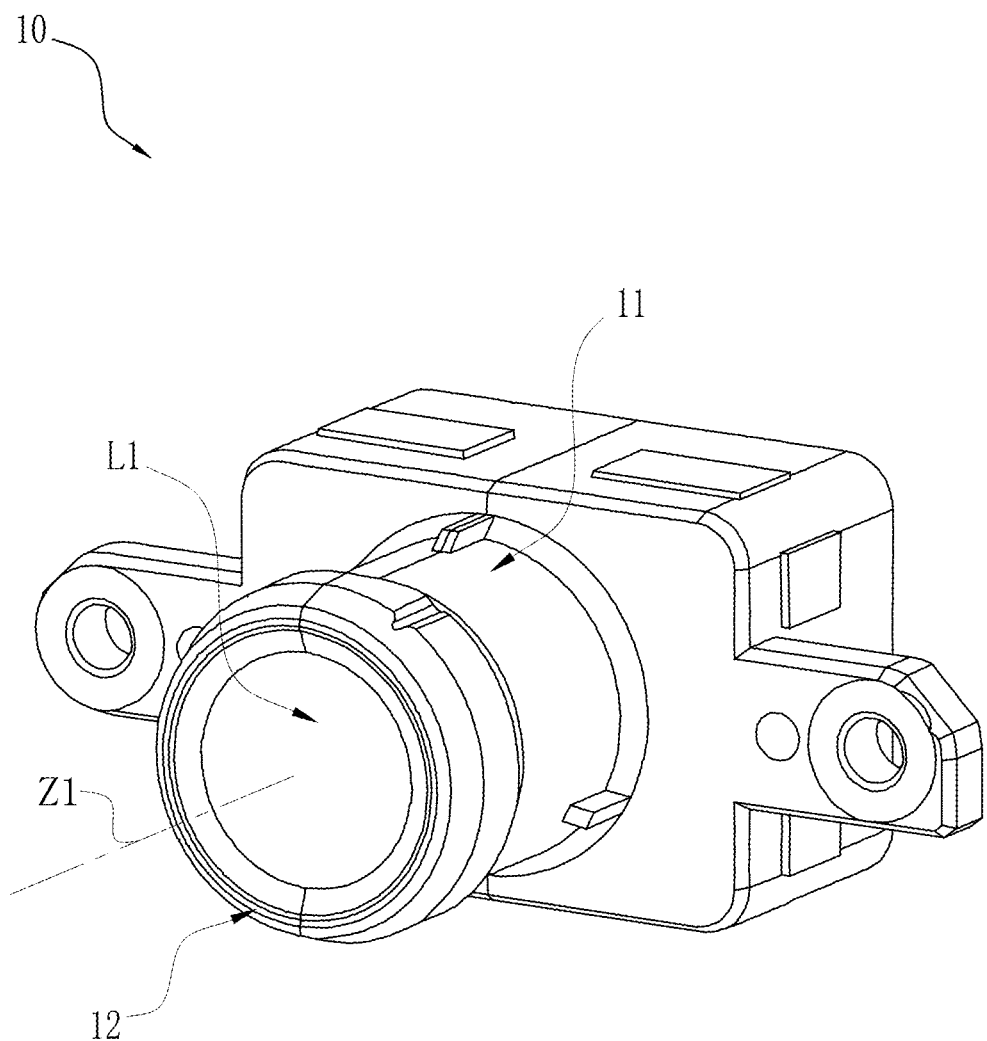
FIG. 1 is an external perspective view of an imaging lens unit.

In case of a lens unit using a press-fitting method, a material strength of a lens barrel must be sufficiently high because the entire circumference of the inner peripheral surface of the lens barrel is subjected to stress from the lens. For example, in case of a lens unit using the press-fitting method, a lens barrel molded from resin may not be able to withstand the stress received from the lens for a long period of time, and stable performance may not be ensured.

In an imaging lens unit and a manufacturing method thereof of the present disclosure, stress received by a lens barrel from a lens can be reduced, and stable performance can be maintained for a long period of time.

An imaging lens unit of an embodiment comprises a plurality of imaging lenses and a lens barrel in which the plurality of imaging lenses are incorporated, the lens barrel includes a lens barrel body formed in a cylindrical shape and a plurality of lens receiving parts, and a fixed lens, which is at least one of the plurality of imaging lenses, is engaged with the plurality of lens receiving parts. The plurality of lens receiving parts are arranged at predetermined intervals in a circumferential direction of the lens barrel body and protrude from an inner peripheral surface of the lens barrel body.

It may be that the lens receiving part has a first surface extended parallel to a central axis of the lens barrel body and a second surface intersecting the first surface, the fixed lens has an outer peripheral surface and a plane orthogonal to the outer peripheral surface, the outer peripheral surface is in contact with the first surface, and the plane is in contact with the second surface, so that the fixed lens is engaged with the plurality of lens receiving parts.

The plurality of lens receiving parts may have a slit cut out in parallel with the first surface from a position where the first surface and the second surface intersect. It may be that the plurality of lens receiving parts may have a third surface located on the opposite side of the second surface, and of the plurality of imaging lenses, an imaging lens different from the fixed lens is in contact with the third surface.

It may be that an imaginary circle passing through the first surfaces in the plurality of lens receiving parts is set in the lens barrel, and a diameter of the imaginary circle before the fixed lens is engaged in the plurality of lens receiving parts is formed smaller than a diameter of the fixed lens.

A difference between the diameter of the fixed lens and the diameter of the imaginary circle before the fixed lens is engaged with the plurality of lens receiving parts may be within the range of 1% to 3% of the diameter of the fixed lens.

The lens receiving part may be arranged at each equal angle with respect to a central axis of the lens barrel body.

It may be that in the lens barrel body, thin parts and thick parts having a larger radial thickness than the thin part are alternately arranged in a circumferential direction, and the lens receiving part is formed in the thick part.

The thick parts may be arranged within the range of 10% to 40% with respect to the entire circumference of the lens barrel body.

The thick parts may be arranged within the range of 10% to 30% with respect to the entire circumference of the lens barrel body.

The thick parts may be arranged within the range of 15% to 25% with respect to the entire circumference of the lens barrel body.

The lens barrel may have a reinforced part located at the same position as the lens receiving part in the circumferential direction of the lens barrel body and protruding from an outer peripheral surface of the lens barrel body.

A manufacturing method of an imaging lens unit of an embodiment comprises a plurality of imaging lenses and a lens barrel in which the plurality of imaging lenses are incorporated, the manufacturing method includes setting an imaginary circle passing through first surfaces in the plurality of lens receiving parts in the lens barrel, and forming a diameter of the imaginary circle smaller than a diameter of a fixed lens, and press-fitting the fixed lens in parallel with a central axis to make an outer peripheral surface contact with the first surface and to make a plane contact with a second surface, so that the fixed lens is engaged with the plurality of lens receiving parts.

Hereinafter, the imaging lens unit of the present disclosure and the manufacturing method thereof will be described in detail.

[Overall Configuration of Imaging Lens Unit]

Figure 2:
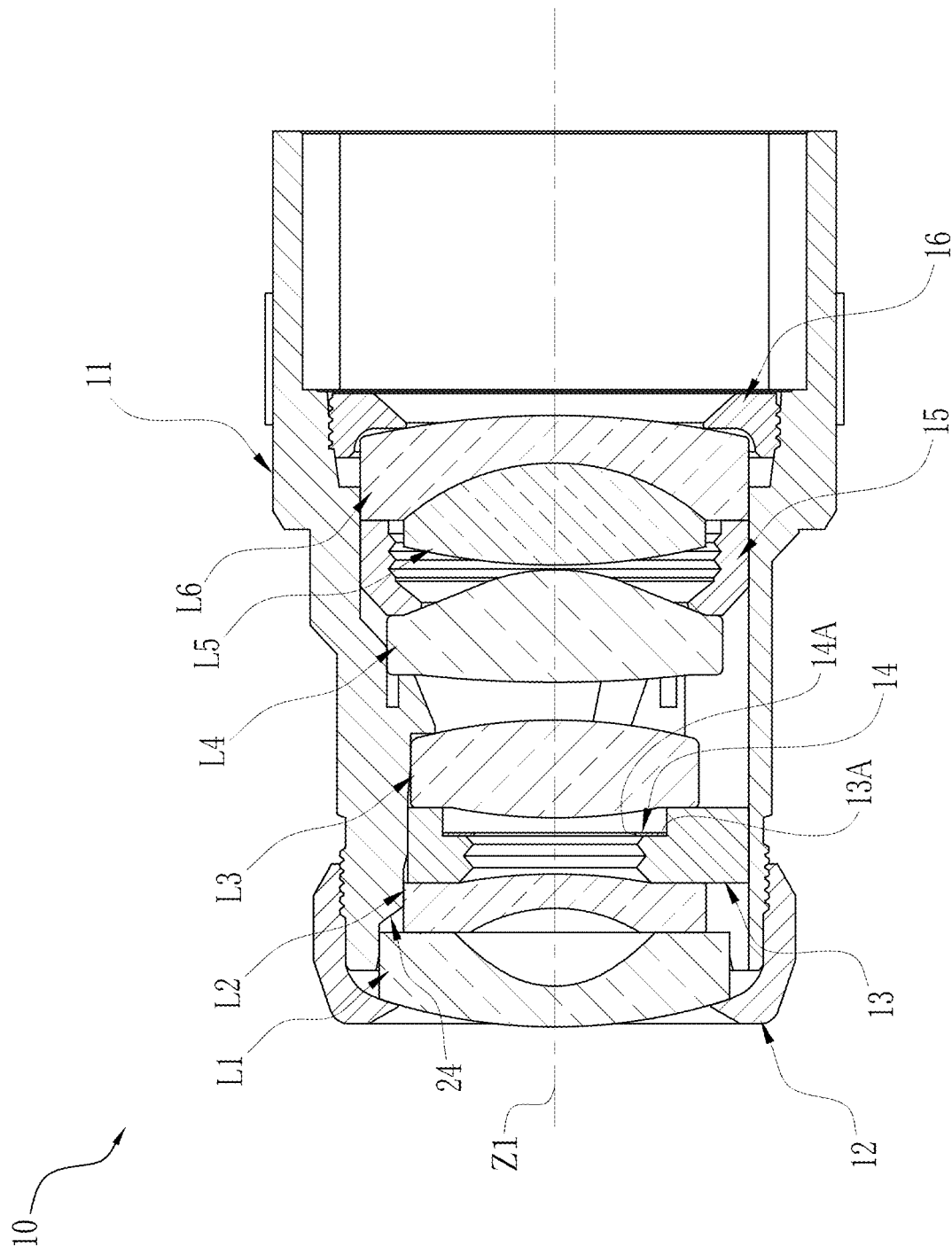
FIG. 2 is a central vertical sectional view of the imaging lens unit.

As shown in FIG. 1, an imaging lens unit 10 includes a lens barrel 11 made of resin and a plurality of lenses incorporated in the lens barrel 11. As shown in FIG. 2, the plurality of lenses included in the imaging lens unit have, for example, six elements of a first lens L1, a second lens L2, a third lens L3, a fourth lens L4, a fifth lens L5, and a sixth lens L6, arranged in order from the object side. These plurality of imaging lenses form a subject image on an imaging surface of an image sensor (not shown) connected to an image plane side of the imaging lens unit 10. Further, the fifth lens L5 and the sixth lens L6 are cemented lenses in which a convex surface of the fifth lens L5 and a concave surface of the sixth lens L6 are cemented to each other by, for example, an adhesive.

The imaging lens unit 10 can be equipped with a plurality of lenses of any number of elements and any power configuration other than the above six elements of the first lens L1, the second lens L2, the third lens L3, the fourth lens L4, the fifth lens L5, and the sixth lens L6. In this embodiment, the imaging lens unit 10 is composed of six lenses of the above lenses L1 to L6.

Figure 3:
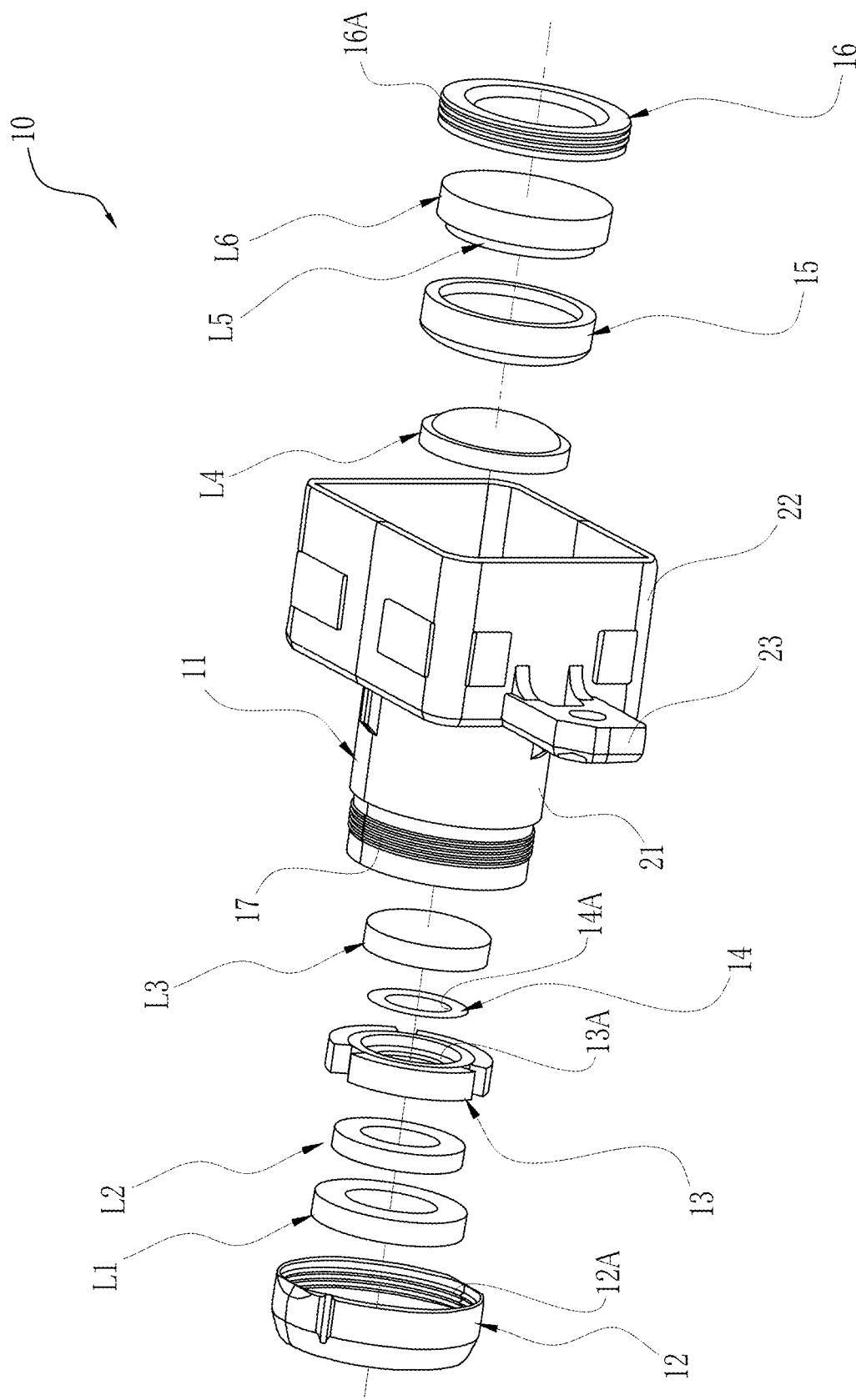
FIG. 3 is an exploded perspective view of the imaging lens unit.

As shown in FIG. 3, the imaging lens unit 10 includes a pressing ring 12, a spacer 13, a diaphragm ring 14, a spacer 15, and a pressing ring 16 in addition to the above lenses L1 to L6. The pressing ring 12 is made of resin and is a ring-shaped pressing member that presses a front surface (object side surface) of the first lens L1 against the lens barrel 11. In the following, end surfaces of the lens barrel 11 and the lenses L1 to L6 on the object side may be referred to as the front surface or the front end, and the opposite end surfaces facing the image sensor, etc. may be referred to as the rear surface or the rear end.

For example, a female screw part 12A is formed on the inner peripheral surface of the pressing ring 12, which is screwed to a male screw part 17 formed on the lens barrel 11, thus the pressing ring 12 is screwed to the lens barrel 11. The pressing ring 12 is fixed to the lens barrel 11 to press the front surface of the first lens L1. By using the pressing ring 12 to press the front surface of the first lens L1, and by engaging with a plurality of lens receiving parts 24 described below, the imaging lens unit 10 stores the lenses L1 to L3 in the lens barrel 11.

The spacer 13 is made of metal and is placed between the second lens L2 and the third lens L3. The spacer 13 maintains the distance between the second lens L2 and the third lens L3 in the lens barrel 11. In addition, a recessed part 13A is formed on the rear surface (image side surface) of the spacer 13, which is recessed one step from the surrounding area. The diaphragm ring 14 is fitted to the recessed part 13A. The diaphragm ring is formed in a circular shape and has a diaphragm aperture 14A.

Figure 4:
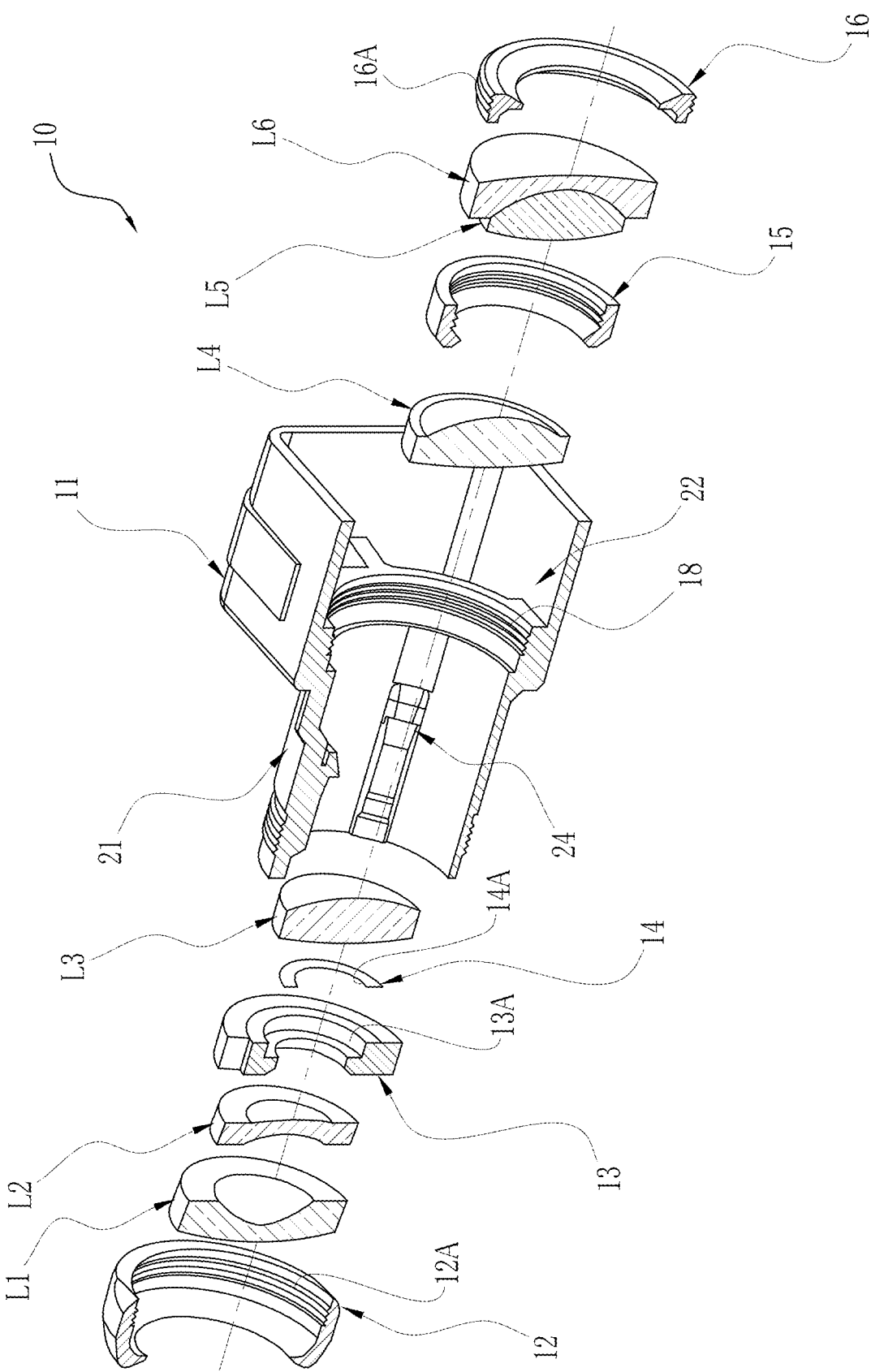
FIG. 4 is an exploded perspective view (cross-sectional view) of the imaging lens unit.

As shown in FIG. 4, the pressing ring 16 is made of resin and is a circular pressing member that presses the rear surface (image side surface) of the sixth lens L6 against the lens barrel 11. For example, a male screw part 16A is formed on the outer peripheral surface of the pressing ring 16 and is screwed with a female screw part 18 formed on the lens barrel 11. This causes the pressing ring 16 to combine with the lens barrel 11. The pressing ring 16 presses the rear surface of the sixth lens L6 by combining with the lens barrel 11.

The imaging lens unit 10 uses the pressing ring 16 to press the rear surface of the sixth lens L6, and stores the lenses L4 to L6 in the lens barrel 11 with the lenses L4 to L6 engaged with the lens receiving parts 24 described below. The spacer 15 is made of metal and is placed between the fourth lens L4 and the fifth lens L5 in the lens barrel 11. The spacer 15 maintains the distance between the fourth lens L4 and the fifth lens L5.

As described above, the imaging lens unit 10 houses the lenses L1 to L6 in the lens barrel 11. And in the imaging lens unit 10, the fourth lens L4 is a glass lens whose expansion or contraction due to temperature change is smaller than that of resin. The fourth lens L4 corresponds to a fixed lens in the claims. The lenses L1 to L3, L5 and L6 other than the fourth lens L4 are also made of glass. In the imaging lens unit 10, the lens barrel 11, the pressing ring 12, and the pressing ring 16 are made of resin.

[Configuration of Lens Barrel]

Figure 5:
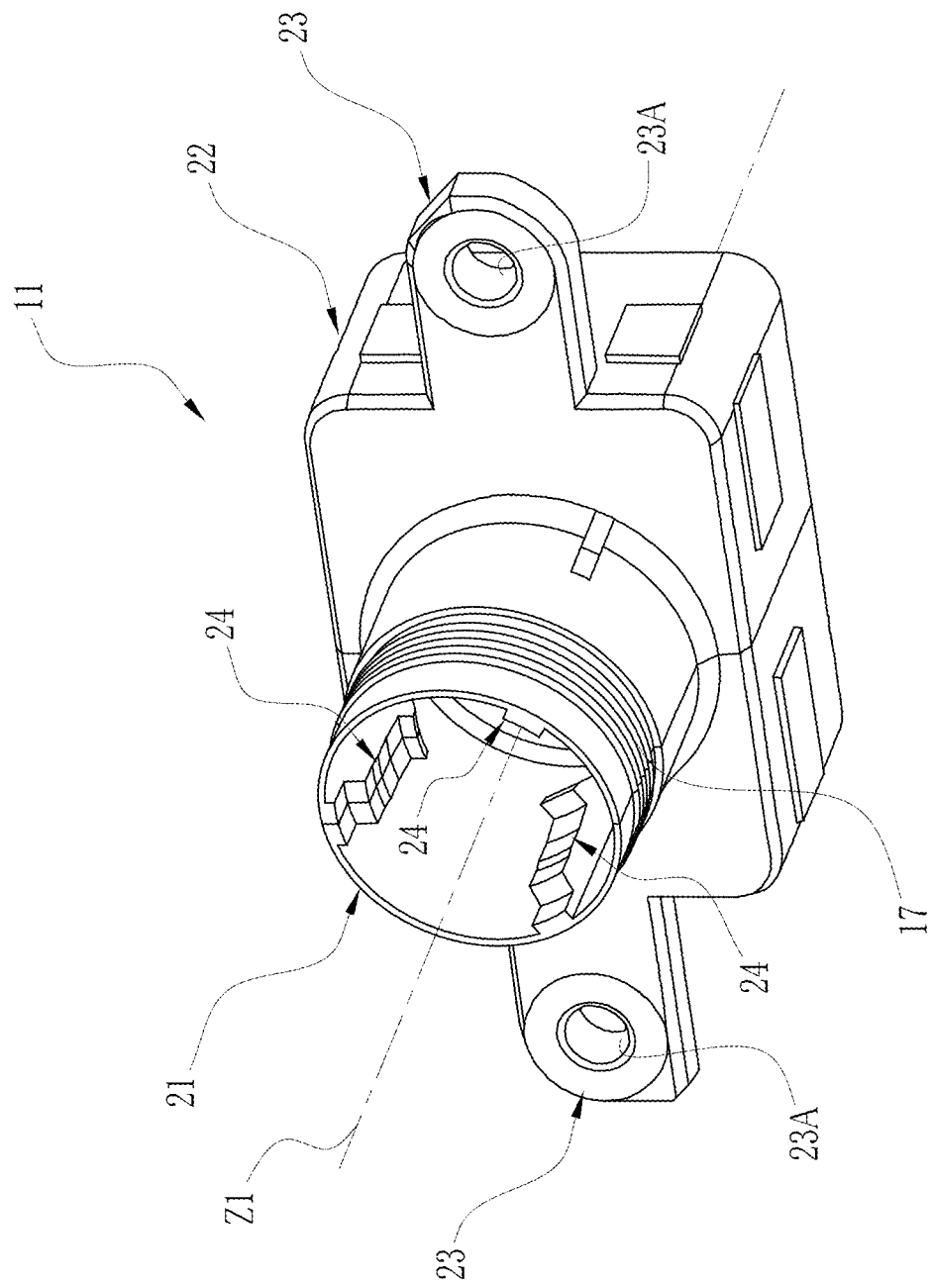
FIG. 5 is a perspective view of a lens barrel.

As shown in FIG. 5, the lens barrel 11 has a lens barrel body 21, a box-shaped part 22, and mounting pieces 23. The lens barrel body 21 is formed in a cylindrical shape. The box-shaped part 22 is formed integrally with the lens barrel body 21 and is continuous with the rear end part of the lens barrel body 21, and is formed in the shape of a horizontally long rectangular box with the rear end part open. The mounting piece 23 protrudes from both sides of the box-shaped part 22 at a position in contact with the front surface, and is formed in a thin plate shape. The mounting piece 23 has a through hole 23A for fixing an image sensor substrate or an exterior component, for example.

Figure 6:
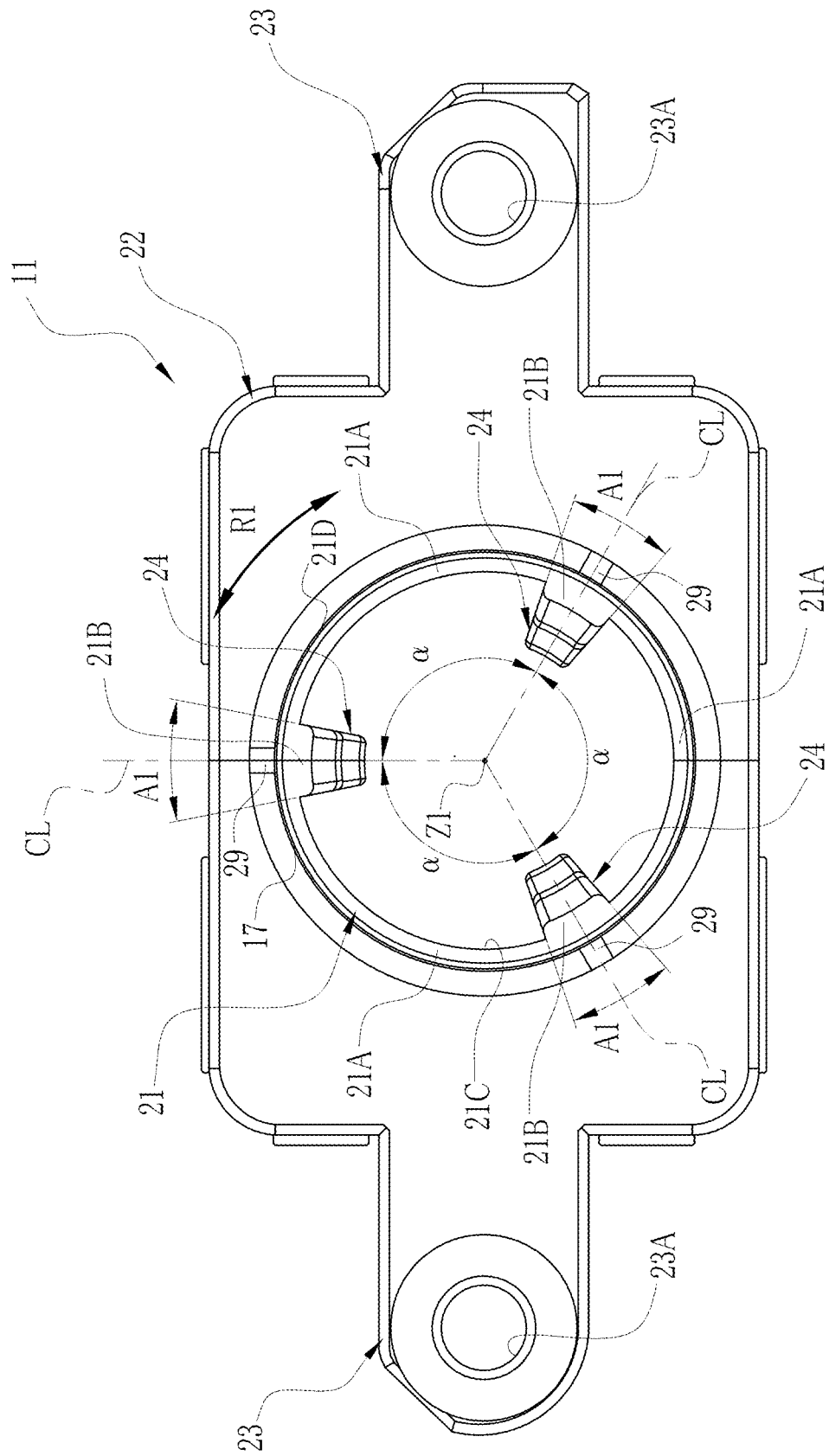
FIG. 6 is a front view of the lens barrel.

The lens barrel body 21 has the three lens receiving parts 24. As shown in FIG. 6, in the lens barrel body 21, thin parts 21A and thick parts 21B, whose radial thickness is larger than the thin part 21A, are formed alternately in a circumferential direction RE The lens receiving part 24 is formed on the thick part 21B.

[Configuration of Lens Receiving Part]

As shown in FIG. 6, the lens receiving parts 24 are arranged at predetermined intervals in the circumferential direction R1 of the lens barrel body 21, and protrude from an inner peripheral surface 21C of the lens barrel body 21. In this embodiment, the lens receiving parts 24 are arranged at positions where the lens barrel body 21 is divided into three in the circumferential direction. That is, a center line CL of the lens receiving part 24 is arranged every equal angle α=120° with respect to a central axis Z1 of the lens barrel body 21.

The thick parts 21B may be arranged within the range of 10% to 40% with respect to the entire circumference of the lens barrel body 21. The thick parts 21B may be arranged within the range of 10% to 30% with respect to the entire circumference of the lens barrel body 21. The thick parts 21B may be arranged within the range of 15% to 25% with respect to the entire circumference of the lens barrel body 21. Because it is a suitable value to ensure the strength of the lens barrel body 21 and to disperse the stress by deforming the thin parts 21A when the lenses L1 to L6 are incorporated. In this embodiment, for each of the lens receiving parts 24, an angle range A1 of the thick part 21B relative to the central axis Z1 is 23°, and the total of 69° for the three lens receiving parts 24 is the total angle range of the thick parts 21B. As a result, the thick parts 21B are arranged at a ratio of 20% with respect to the entire circumference of the lens barrel body 21.

Figure 7:
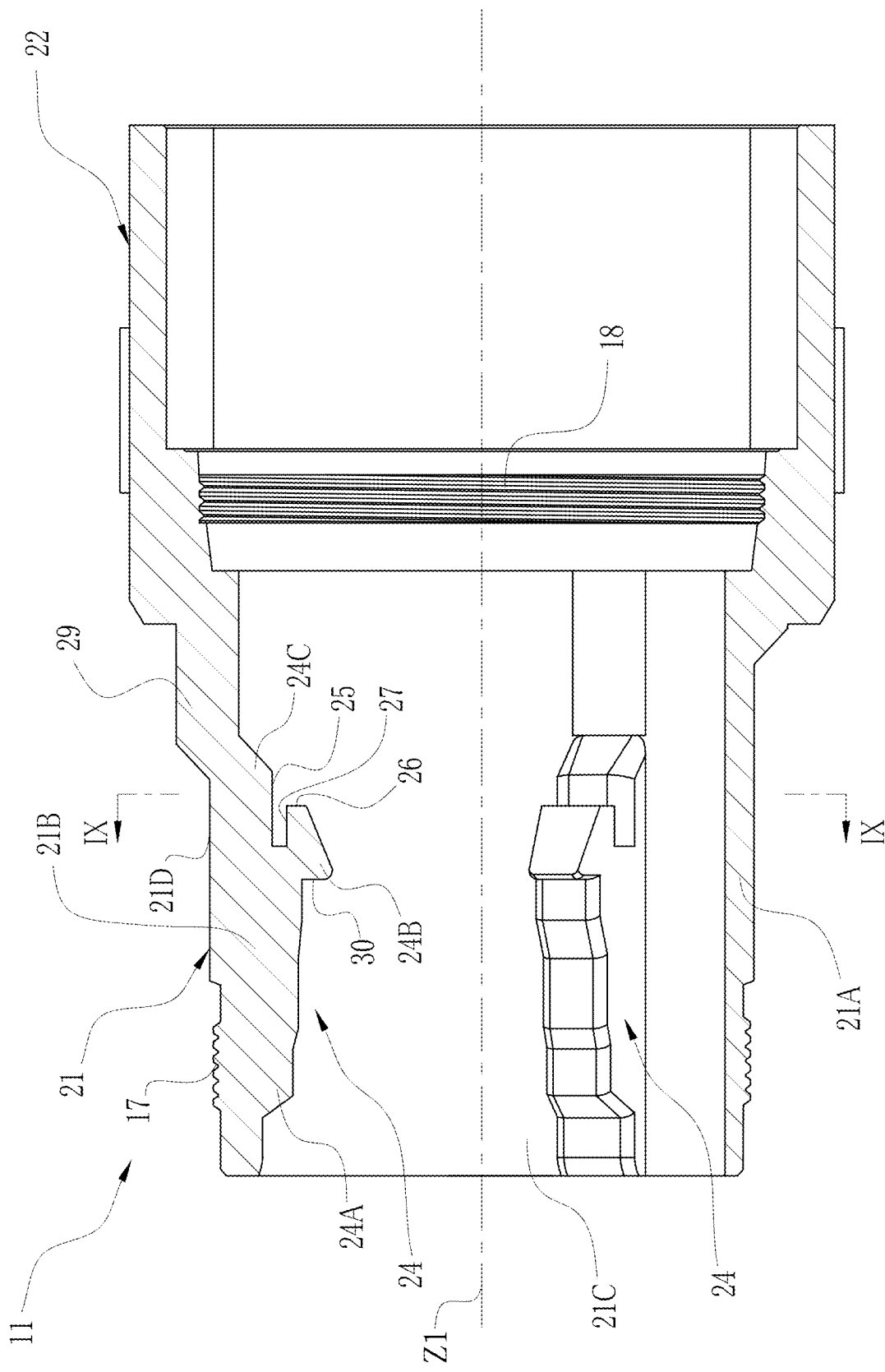
FIG. 7 is a central vertical sectional view of the lens barrel.

As shown in FIG. 7, in the lens receiving part 24, a first projecting part 24A, a second projecting part 24B, and a third projecting part 24C are continuously formed from the front to the rear of the lens barrel body 21.

The second projecting part 24B is the part of the lens receiving part 24 that protrudes the most from the inner peripheral surface 21C. The first lens L1 to the third lens L3 are stored in the lens barrel body 21 in a position forward from the second projecting part 24B. The fourth lens L4 to the sixth lens L6 are stored in the lens barrel body 21 in a position behind the second projecting part 24B. Therefore, the second projecting part 24B abuts on a rear surface of the third lens L3 and a front surface 31B of the fourth lens L4 (see also FIG. 12).

The first projecting part 24A is located in front of the second projecting part 24B. In addition, the first projecting part 24A is formed in a staircase shape in which the amount of protrusion from the inner peripheral surface 21C gradually decreases from the rear end side to the front end side of the lens barrel body 21. The first projecting part 24A engages with outer peripheral surfaces of the first lens L1 to the third lens L3.

The third projecting part 24C is located behind the second projecting part 24B. The third projecting part 24C has a first surface 25 extending parallel to the central axis Z1 of the lens barrel body 21. The first surface 25 abuts on an outer peripheral surface 31A of the fourth lens L4 (see also FIG. 12).

The second projecting part 24B abuts on the front surface 31B of the fourth lens L4, as described above. The front surface 31B of the fourth lens L4 is a plane orthogonal to the outer peripheral surface 31A. A surface of the second projecting part 24B that abuts on the front surface 31B of the fourth lens L4 is defined as the second surface 26. The first surface 25 and the second surface 26 are in a positional relationship that intersects each other. In this embodiment, the first surface 25 and the second surface 26 are orthogonal to each other.

The lens receiving part 24 has a slit 27 cut out from the intersection of the first surface 25 and the second surface 26. The slit 27 is continuous with the first surface 25 and is formed in the same direction as the first surface 25, that is, parallel to the central axis Z1 of the lens barrel body 21.

As described above, the first lens L1 to the sixth lens L6 are glass lenses. The first lens L1 to the sixth lens L6 constitute an optical system that satisfies predetermined specifications, and glass materials suitable for satisfying the predetermined specifications are employed in each lens. Therefore, the strength of the glass of the lens varies depending on the glass material employed. In this embodiment, for satisfying the predetermined specification, for example, the fourth lens L4 has a weaker glass strength than other lenses. Also, since glass lenses deform less than plastic lenses, the lens barrel body 21 receives a large amount of stress from the fourth lens L4. In this embodiment, the fourth lens L4 and the three lens receiving parts 24 engage with each other as described above to reduce the stress on the lens barrel 11.

Figure 8A:
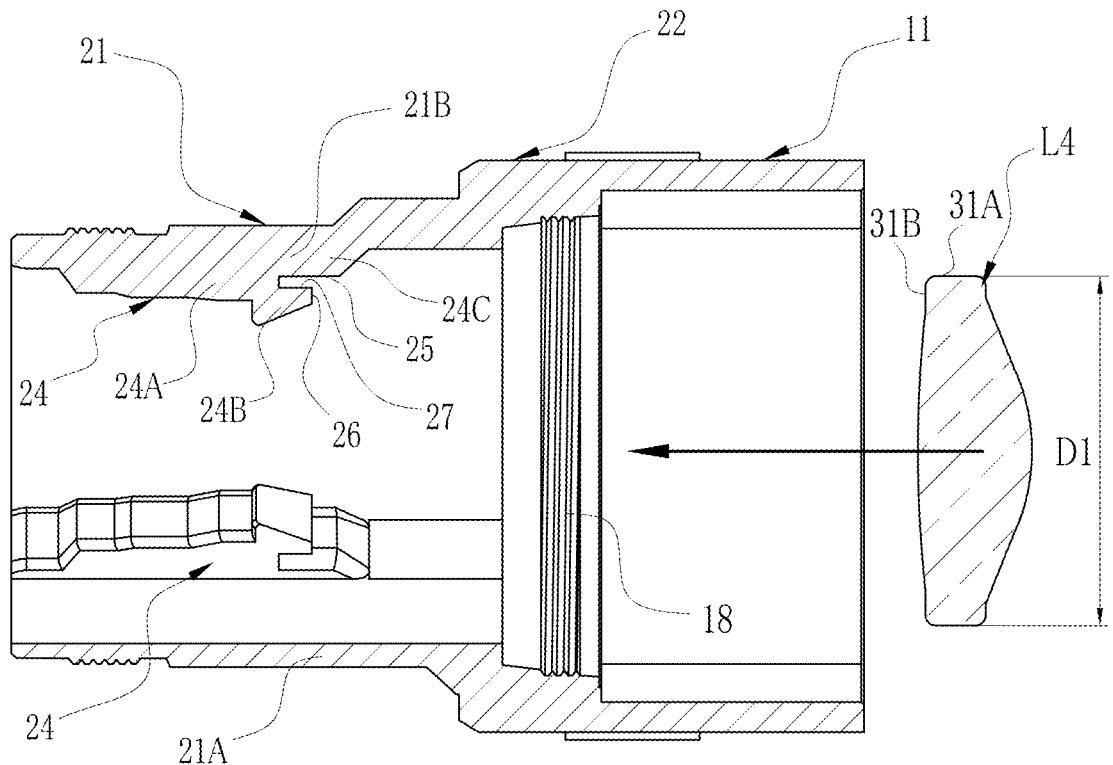
FIG. 8A is a cross-sectional view showing a state before engaging the imaging lens with the lens barrel.
Figure 8B:
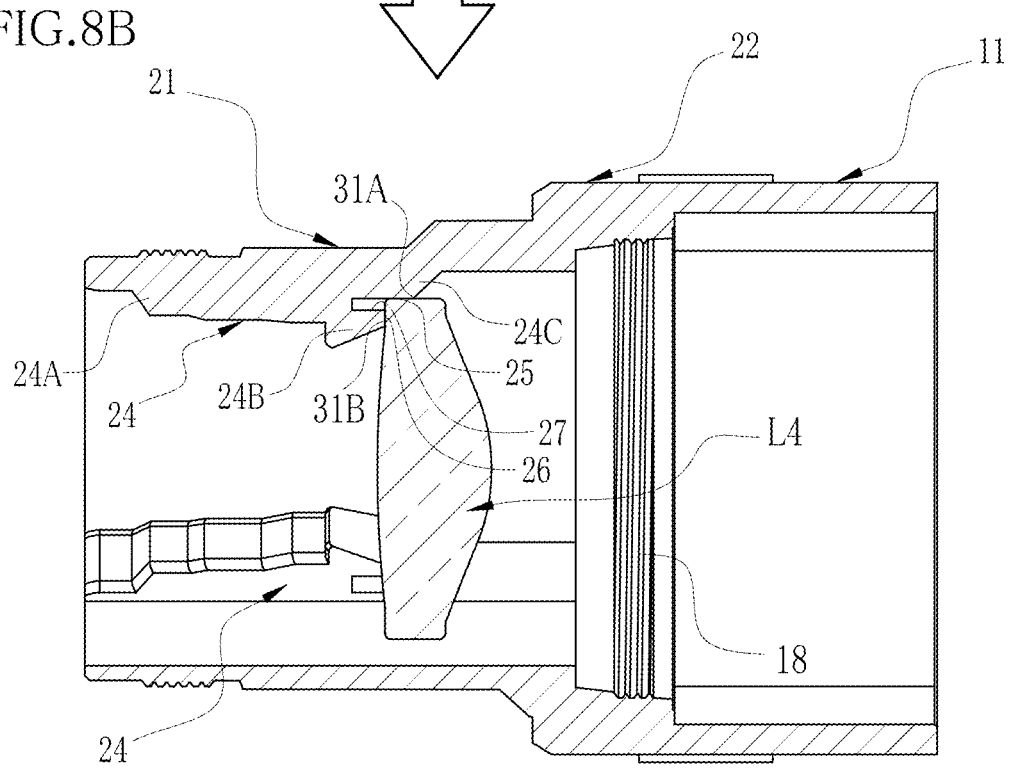
FIG. 8B is a cross-sectional view showing a state after engaging the imaging lens with the lens barrel.
Figure 9:
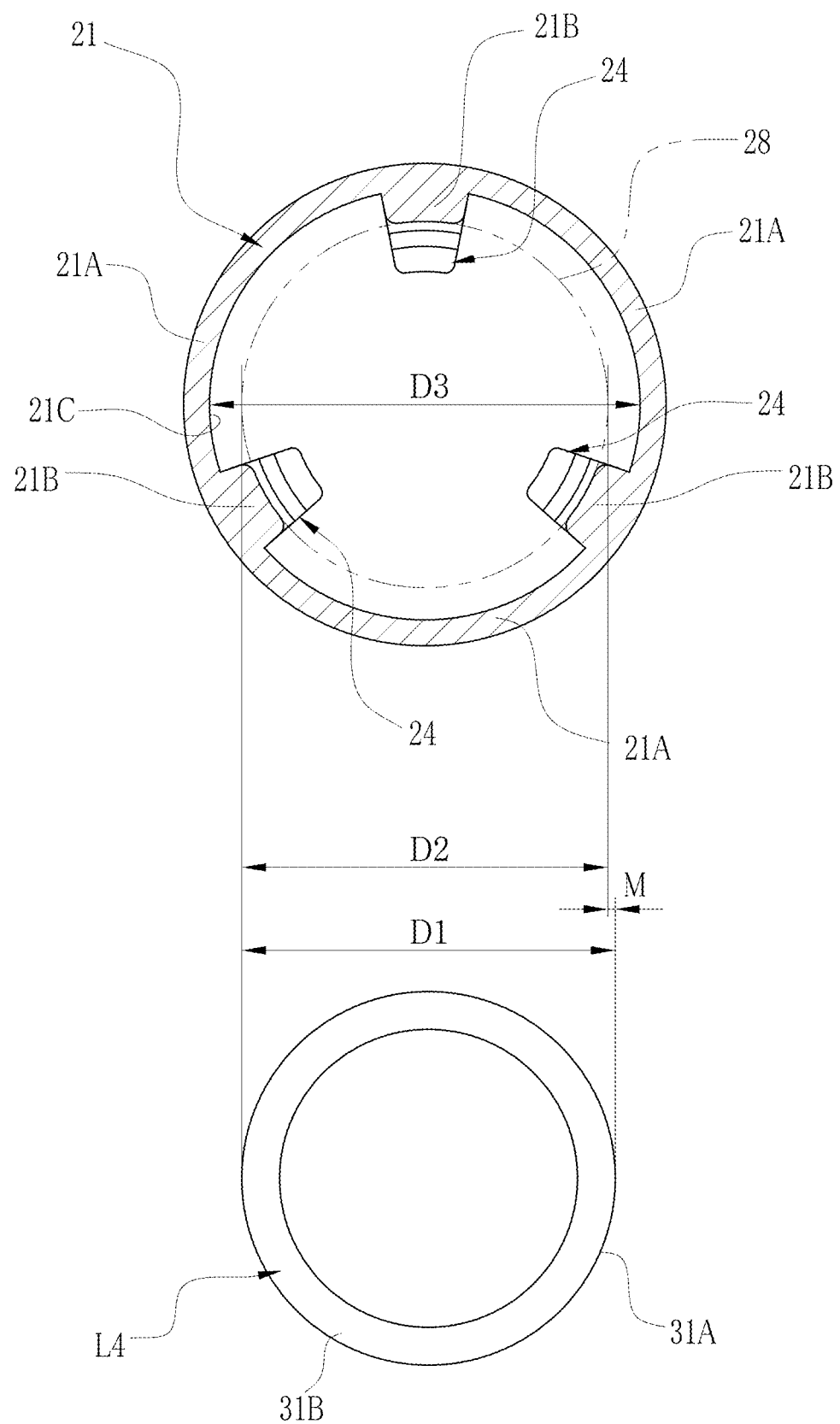
FIG. 9 is a cross-sectional view of the lens barrel taken along a line IX-IX of FIG. 7, showing a state before a fixed lens is engaged with a plurality of lens receiving parts.
Figure 10:
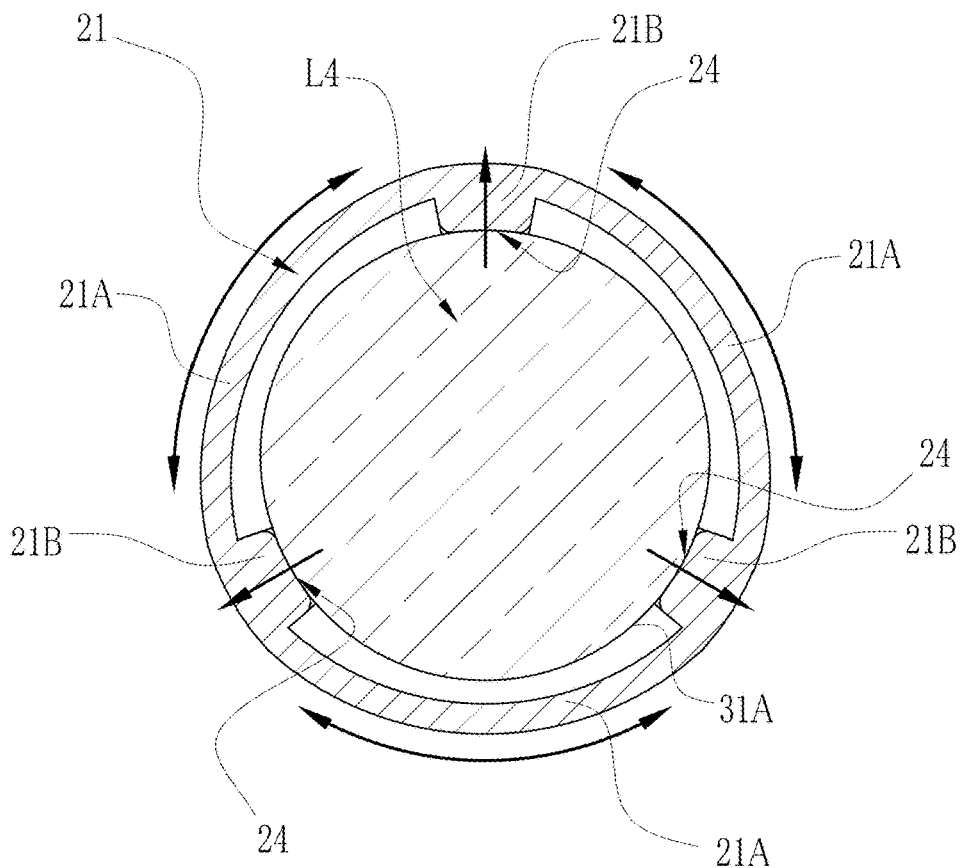
FIG. 10 is a cross-sectional view of the lens barrel showing a state after the fixed lens is engaged with the plurality of lens receiving parts.

Explained below are the process of incorporating the fourth lens L4 into the lens barrel 11, and the effect of this embodiment in reducing the stress on the lens barrel body 21 as compared with the conventional case. As shown in FIGS. 8A and 9, in case an imaginary circle 28 (the circle shown by the two-dot chain line in FIG. 9) passing through the three first surfaces 25 is set, a diameter D2 of the imaginary circle 28 before the fourth lens L4 engages with the lens receiving part 24 is smaller than a diameter D1 of the fourth lens L4 and smaller than a diameter D3 of the inner peripheral surface 21C. Therefore, as shown in FIGS. 8B and 10, when the fourth lens L4 is inserted from the rear end side of the lens barrel body 21 and pressed in a direction parallel to the central axis Z1, the fourth lens L4 is press-fitted into the lens receiving part 24. That is, the fourth lens L4 is engaged with the lens receiving part 24 by the outer peripheral surface 31A contacting the first surface 25 and the front surface 31B contacting the second surface 26. Here, a difference M between the diameter D1 of the fourth lens L4 and the diameter D2 of the imaginary circle 28 before the engagement of the fourth lens L4 with the lens receiving part 24 is absorbed by deformation of the thin part 21A.

In this embodiment, the difference M described above is 2% of the diameter D1 of the fourth lens L4. Note that the difference M may be in the range of 1% to 3% of the diameter DE This is to hold the fourth lens L4 securely while suppressing the stress that the lens barrel body 21 receives.

As shown in FIG. 10, when the fourth lens L4 engages the lens receiving part 24, the thick part 21B in which the lens receiving part 24 is formed is displaced outward by the amount of the difference M described above. As the thick part 21B is displaced, the thin part 21A becomes, for example, an arc shape with a larger radius of curvature or a more linear shape, so the cross-sectional shape of the lens barrel body 21 through the fourth lens L4 becomes closer to a triangular shape than the original circular shape.

In this way, when the fourth lens L4 is press-fitted, the thin part 21A, which is more easily deformed, is deformed so as to extend. As mentioned above, the thin part 21A has a large proportion of the total circumference of the lens barrel body, and the thick part 21B has a small proportion of the total circumference of the lens barrel body. This allows the thin part 21A to disperse the stress received from the fourth lens L4. Moreover, since there is a gap between the thin part 21A and the fourth lens L4, the deformation of the thin part 21A is not hindered. As a result of the deformation of the thin part 21A, the stress on the lens barrel 11 is reduced, so that stable performance can be achieved even when used for a long period of time, for example, over 10 years, and over a wide temperature range.

Figure 11:
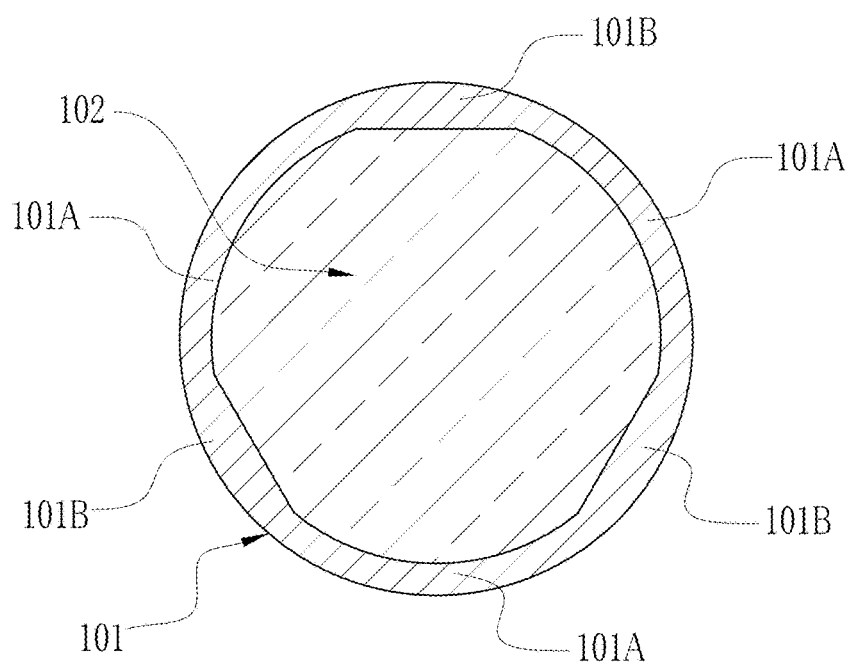
FIG. 11 is an example of a cross-sectional view of a conventional imaging lens unit in which an imaging lens is press-fitted into a lens barrel.

For example, when a lens is press-fitted into a lens barrel with a circular inner peripheral surface as in a conventional case, the entire circumference of the inner peripheral surface, which is in contact with the outer peripheral surface of the lens, receives stress directly from the lens. Therefore, even if the entire circumference of the inner peripheral surface is made into a thin part that is easily deformed, there is a limit to the amount of stress that can be reduced. Further, for example, in a conventional imaging lens unit shown in FIG. 11, a lens 102 having a D-cut outer peripheral surface is incorporated into a lens barrel 101 by press-fitting. In the cross-sectional shape of the lens barrel 101 passing through the lens 102, a part abutting on the outer peripheral surface is a thin part 101A, and a part corresponding to the D cut is a thick part 101B. In this case, the thin part 101A is naturally more easily deformed than the thick part 101B. However, since the thin part 101A is in contact with the outer peripheral surface of the lens 102 and is directly subjected to stress, the stress cannot be dispersed. On the other hand, in this embodiment, since the thin part 21A can be deformed to reduce stress, more stable performance than the conventional one can be realized.

After the fourth lens L4 is press-fitted into the lens barrel body 21, the spacer 15 is inserted from the rear end side of the lens barrel body 21. After that, the fifth lens L5 and the sixth lens L6 are inserted from the rear end side of the lens barrel body 21, and the rear surface of the sixth lens L6 is pressed by using the pressing ring 16. Next, the third lens L3 is inserted from the front end side of the lens barrel body 21 and pressed in a direction parallel to the central axis Z1, so that the third lens L3 is press-fitted into the lens receiving part 24. Then the spacer 13 is inserted from the front end side of the lens barrel body 21, the first lens L1 and the second lens L2 are inserted from the front end side of the lens barrel body 21 and press-fitted, and the front surface of the first lens L1 is pressed using the pressing ring 12. As a result, the lenses L1 to L6 can be housed in the lens barrel 11.

Figure 12:
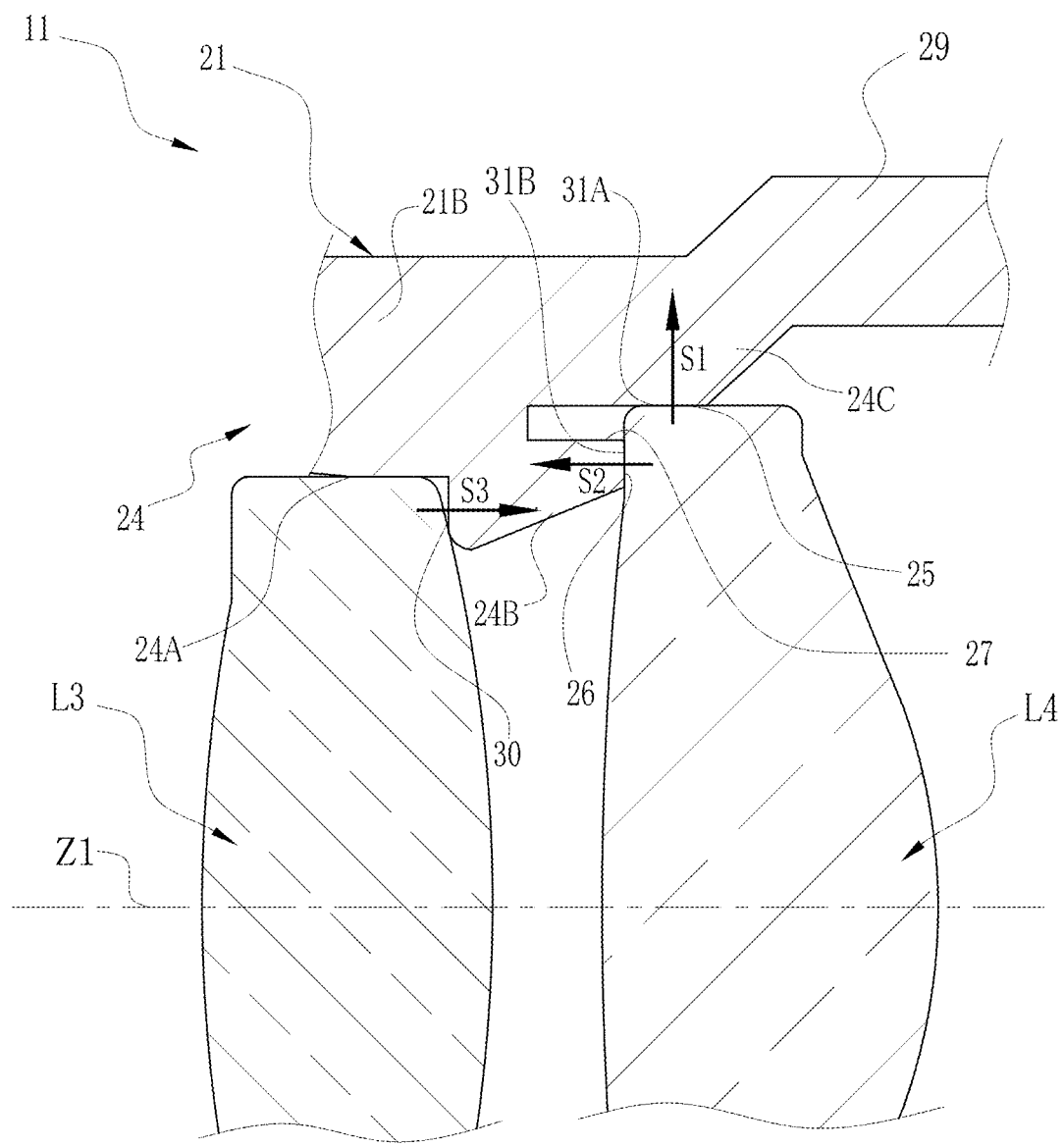
FIG. 12 is a cross-sectional view of a periphery of the lens receiving part, where an outer peripheral surface and a front surface of the fixed lens abut on a first surface and a second surface of the lens receiving part.

As shown in FIG. 12, in the lens receiving part 24, the first surface 25 abuts on the outer peripheral surface 31A of the fourth lens L4 to generate a stress S1, and the second surface 26 abuts on the front surface 31B of the fourth lens L4 to produce a stress S2. However, since the slit 27 is formed, the stress generated in the lens barrel 11 can be reduced even when the fourth lens L4 is engaged with the lens receiving part 24. In particular, the first surface 25, which receives the stress from the outer peripheral surface 31A, is more likely to disperse the stress by the slit 27.

Figure 13:
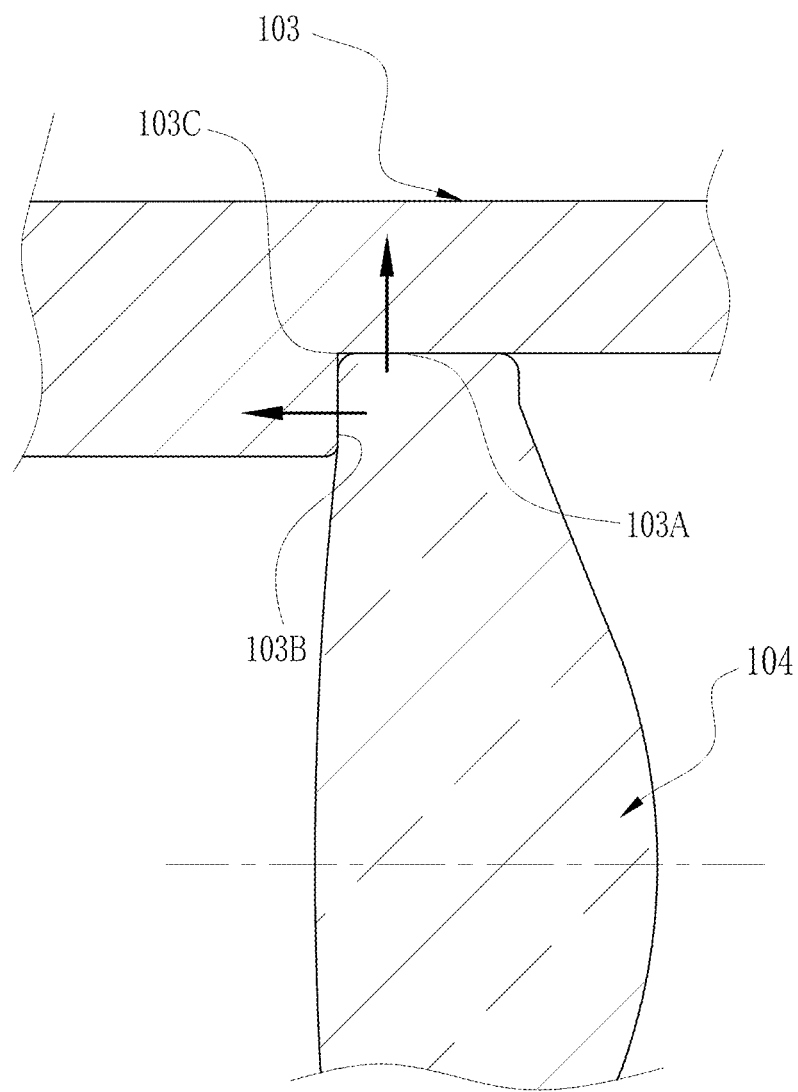
FIG. 13 is an example of a cross-sectional view of a main part of a lens barrel in a conventional imaging lens unit, where an outer peripheral surface and a front surface of an imaging lens abut on the lens barrel.

For example, in a conventional imaging lens unit shown in FIG. 13, a slit or the like is not formed, and an inner peripheral surface 103A of a lens barrel 103 and an abutting surface 103B continuous with the inner peripheral surface 103A are in contact with an outer peripheral surface and a front surface of a lens 104. Here, a vicinity of a corner 103C where the inner peripheral surface 103A and the abutting surface 103B intersect is subject to stress in different directions due to contact with the outer peripheral surface and front surface of the lens 104, so the load is very large. Therefore, in case the lens barrel 103 is formed of resin, the material strength may not be sufficient. On the other hand, in this embodiment, since the slit 27 is provided as described above, the stress received by the lens barrel 11 can be reduced without receiving stress in different directions in the vicinity of the corner.

Further, in this embodiment, the third lens L3, which is different from the fourth lens L4, is press-fitted from the front end side of the lens barrel body 21 and is in contact with the second projecting part 24B. Specifically, in the second projecting part 24B, since the third lens L3 is in contact with a third surface 30, which is located on the opposite side of the second surface 26, the third surface 30 is subjected to a stress S3 in the opposite direction to the stress S2 that the second surface 26 of the lens receiving part 24 is subjected to. Therefore, the stress at the lens receiving part 24 can be reduced because the stress S2 and the stress S3 cancel each other out.

[Configuration of Reinforced Part]

Also, as shown in FIGS. 6 and 7, the lens barrel 11 has a reinforced part 29 located at the same position as the lens receiving part 24 in the circumferential direction R1 of the lens barrel body 21 and protruding from an outer peripheral surface 21D of the lens barrel body 21. Specifically, the reinforced part 29 is a part of the thick part 21B of the lens barrel body 21, and is formed continuously with the box-shaped part 22 at the rear end part of the lens barrel body 21. By having the reinforced part 29, when the lens barrel 11 is molded, the resin spreads over the thick part 21B, and the lens receiving part 24 can be formed accurately.

Figure 14:
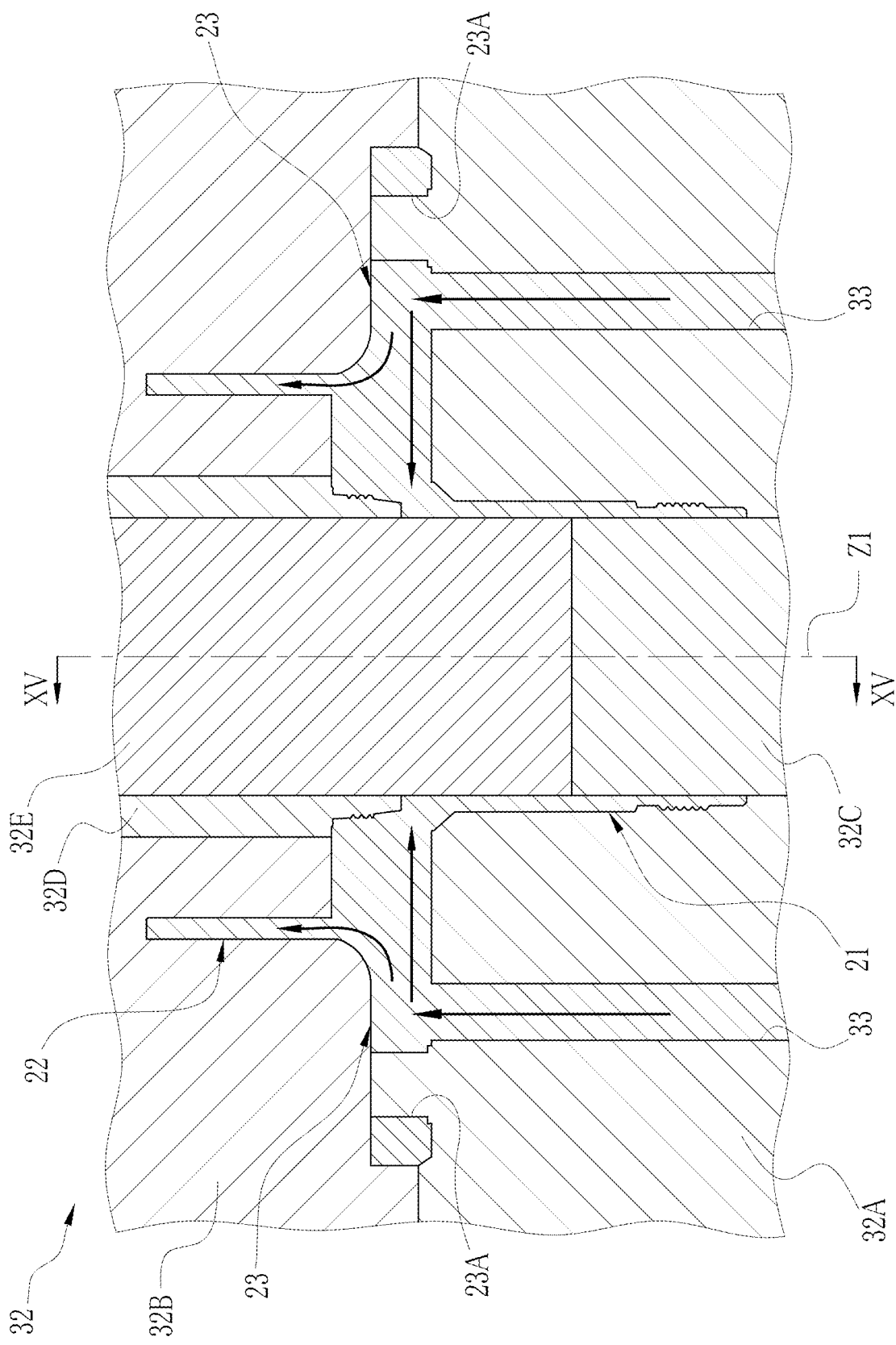
FIG. 14 is a cross-sectional view of a main part showing a resin molding process for the lens barrel.
Figure 15:
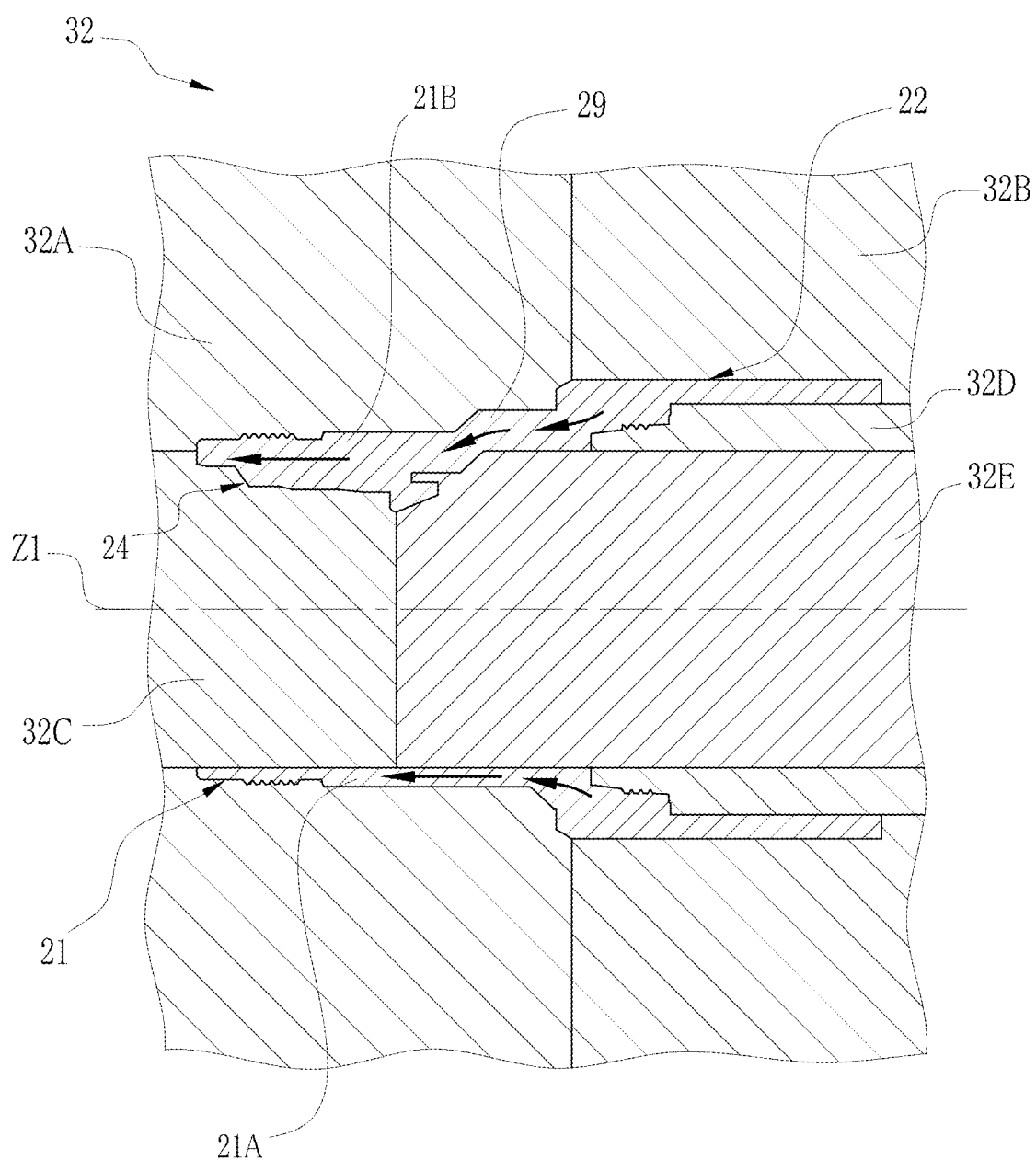
FIG. 15 is a cross-sectional view taken along a line XV-XV of FIG. 14.

An outline of a resin molding process of the lens barrel 11 will be described with reference to FIGS. 14 and 15. FIGS. 14 and 15 show an example of a molding die 32 in which the lens barrel 11 is resin-molded. The molding die 32 is configured by appropriately using slide dies 32C to 32E in addition to molding dies 32A and 32B that mainly mold the front surface side and rear surface side of the lens barrel 11, so that the lens barrel 11 can be easily released after resin molding the lens barrel 11. Note that the molding die 32 is not limited to the structure and shape shown in the figure.

The molding die 32A is formed with gates 33, which are paths for resin to flow into the product part of the lens barrel 11. The gate 33 is arranged in a position continuous with the mounting piece 23 when the lens barrel 11 is molded using the molding die 32. As mentioned above, the mounting pieces 23 are located on both sides of the lens barrel body 21 and the box-shaped part 22.

When the resin is injected into the molding die 32 from the gates 33, as shown in FIG. 14, the resin first flows from the mounting piece 23 located on both sides to the parts where the box-shaped part 22 and the lens barrel body 21 are molded. Then, in the part where the lens barrel body 21 is molded, the resin flows from the rear end side to the front end side of the lens barrel body 21.

As mentioned above, the lens barrel 11 has the reinforced part 29, and the reinforced part 29 is arranged at the rear end part of the lens barrel body 21 in a position continuous with the box-shaped part 22. Therefore, as shown in FIG. 15, the resin flows into the part where the reinforced part 29 is molded from the part where the mounting piece 23 is molded. Since the resin easily flows from the part where the reinforced part 29 is molded to the front end side of the lens barrel body 21, the thick part 21B, which is in the same position as the reinforced part 29 in the circumferential direction R1, is filled with resin and can be molded with a high filling rate. Furthermore, the lens receiving part 24 arranged in the thick part 21B can be formed accurately. After the resin molding, the process of manufacturing the lens barrel 11 is completed by cutting the resin part that has flowed into the gate 33.

In addition, since the thickness dimension of the lens barrel body 21 in the thick part 21B is further increased by forming the reinforced part 29 on the lens barrel 11, the coefficient of linear expansion of the lens barrel body 21 in the direction parallel to the central axis Z1 is lowered, and the deformation of the lens barrel body 21 in the direction parallel to the central axis Z1 can be suppressed. As a result, stable performance can be achieved over a long period of time and over a wide range of temperatures.

In the above embodiment, the fourth lens L4, which is press-fitted from the rear end side of the lens barrel body 21, is mainly exemplified as the fixed lens that is engaged and fixed to the lens receiving part 24. However, not limited to this, any lens incorporated in the lens barrel 11 can be fixed in the same manner. Also, in case of fixing the third lens L3, etc., which is press-fitted from the front end side of the lens barrel body 21, in the same way as the fourth lens L4, the lens receiving part 24 may have a first surface in contact with the outer peripheral surface of the third lens L3, a second surface in contact with the rear surface of the third lens L3, and a slit cut out parallel to the first surface 25 from the intersection of the first surface and the second surface.

In the above embodiment, the three lens receiving parts 24 are provided for the one lens barrel body 21, but the present application is not limited to this, and two or four or more lens receiving parts may be provided. In this case, as in the above embodiment, the center line of the lens receiving part may be arranged at each equal angle with respect to the central axis of the lens barrel body.

Further, in the above embodiment, the first lens L1 to the sixth lens L6 are made of glass, but the present application is not limited to this, and the first lens L1 to the sixth lens L6 may be made of resin. For example, a part of the first lens L1 to the sixth lens L6 may be made of glass, and the rest may be made of resin. Further, the fixing of the pressing rings 12 and 16 to the lens barrel 11 is not limited to screwing, but may be fixed by other methods such as adhesion.

In the above embodiment, the first projecting part 24A is formed in the staircase shape in which the amount of protrusion from the inner peripheral surface 21C gradually decreases from the rear end side to the front end side of the lens barrel body 21, but the present application is not limited to this. For example, the first projecting part 24A may be formed in a staircase shape in which the amount of projection from the inner peripheral surface 21C gradually increases from the rear end side to the front end side of the lens barrel body 21. For example, the first projecting part 24A is formed in a staircase shape in which the amount of projection from the inner peripheral surface 21C gradually decreases from the rear end side of the lens barrel body 21 toward the center part, and in a staircase shape in which the amount of projection from the inner peripheral surface 21C gradually increases from the center part toward the front end side. For example, the first projecting part 24A is formed in a staircase shape in which the amount of projection from the inner peripheral surface 21C gradually increases from the rear end side of the lens barrel body 21 toward the center part, and in a staircase shape in which the amount of projection from the inner peripheral surface 21C gradually decreases from the center part toward the front end side.

The present disclosure is not limited to the above-described embodiment, and may extend to various modifications of the above-described embodiment within the scope of the present disclosure.

10: imaging lens unit
11: lens barrel
12: pressing ring
12A: female screw part
13: spacer
13A: recessed part
14: diaphragm ring
14A: diaphragm aperture
15: spacer
16: pressing ring
16A: male screw part
17: male screw part
18: female screw part
21: lens barrel body
21A: thin part
21B: thick part
21C: inner peripheral surface
21D: outer peripheral surface
22: box-shaped part
23: mounting piece
23A: through hole
24: lens receiving part
24A: first projecting part
24B: second projecting part
24C: third projecting part
25: first surface
26: second surface
27: slit
28: imaginary circle
29: reinforced part
30: third surface
31A: outer peripheral surface
31B: front surface
32: molding die
32A: molding die
32B: molding die
32C: slide die
32D: slide die
32E: slide die
33: gate
101: lens barrel
101A: thin part
101B: thick part
102: lens
103: lens barrel
103A: inner peripheral surface
103B: abutting surface
103C: corner
104: lens
A1: angle range
CL: center line
D1: diameter
D2: diameter
D3: diameter
L1: first lens
L2: second lens L3: third lens
L4: fourth lens
L5: fifth lens
L6: sixth lens
M: difference
R1: circumferential direction
S1: stress
S2: stress
S3: stress
Z1: central axis
a: equal angle

What is claimed is:

1. An imaging lens unit, comprising:
a plurality of imaging lenses including a fixed lens; and
a lens barrel including the plurality of imaging lenses therein, the lens barrel including:
 a lens barrel body having a cylindrical shape, and
 a plurality of lens receiving parts
  arranged at predetermined intervals in a circumferential direction of the lens barrel body and
  protruding from an inner peripheral surface of the lens barrel body,
wherein
 the lens barrel body is deformed upon engagement of the fixed lens with the plurality of lens receiving parts,
 the lens barrel body includes a plurality of thin parts and a plurality of thick parts arranged alternately in the circumferential direction of the lens barrel body,
 each of the plurality of thin parts has a first radial thickness,
 each of the plurality of thick parts has a second radial thickness larger than the first radial thickness,
 upon the engagement of the fixed lens with the plurality of lens receiving parts, the plurality of thick parts is displaced outward and the plurality of thin parts is deformed,
 upon the engagement of the fixed lens with the plurality of lens receiving parts, the plurality of thick parts is displaced outward in a radial direction of the lens barrel body,
 each of the plurality of thin parts has an arc shape, and
 upon the engagement of the fixed lens with the plurality of lens receiving parts, a radius of curvature of the plurality of thin parts before the fixed lens is engaged with the plurality of lens receiving parts becomes larger becomes larger.

2. The imaging lens unit according to claim 1,
wherein each of the plurality of lens receiving parts has:
 a first surface extended parallel to a central axis of the lens barrel body; and
 a second surface intersecting the first surface,
wherein the fixed lens has:
 an outer peripheral surface; and
 a plane surface orthogonal to the outer peripheral surface, and
wherein when the outer peripheral surface is in contact with the first surface, and the plane surface is in contact with the second surface, the fixed lens is engaged with the plurality of lens receiving parts.

3. The imaging lens unit according to claim 2, wherein each of the plurality of lens receiving parts has a slit cut out in parallel with the first surface from a position where the first surface and the second surface intersect.

4. The imaging lens unit according to claim 2,
wherein each of the plurality of lens receiving parts has a third surface located on an opposite side of the second surface, and
wherein of the plurality of imaging lenses, an imaging lens different from the fixed lens is in contact with the third surface.

5. The imaging lens unit according to claim 3, wherein the fixed lens has a diameter larger than a diameter of an imaginary circle passing through the first surfaces of the plurality of lens receiving parts before the fixed lens is engaged with the plurality of lens receiving parts.

6. The imaging lens unit according to claim 5, wherein a difference between the diameter of the fixed lens and the diameter of the imaginary circle before the fixed lens is engaged with the plurality of lens receiving parts is within a range of 1% to 3% of the diameter of the fixed lens.

7. The imaging lens unit according to claim 1, wherein the plurality of lens receiving parts is arranged at an equal angle with respect to a central axis of the lens barrel body.

8. The imaging lens unit according to claim 1,
wherein in the lens barrel body, thin parts and thick parts having a larger radial thickness than the thin part are alternately arranged in the circumferential direction of the lens barrel body, and
wherein the plurality of lens receiving parts is formed in the thick parts.

9. The imaging lens unit according to claim 8, wherein the thick parts are arranged within a range of 10% to 40% with respect to an entire circumference of the lens barrel body.

10. The imaging lens unit according to claim 8, wherein the thick parts are arranged within a range of 10% to 30% with respect to an entire circumference of the lens barrel body.

11. The imaging lens unit according to claim 8, wherein the thick parts are arranged within a range of 15% to 25% with respect to an entire circumference of the lens barrel body.

12. The imaging lens unit according to claim 1, wherein the lens barrel has a plurality of reinforced parts located at a same position as the plurality of lens receiving parts in the circumferential direction of the lens barrel body and protruding from an outer peripheral surface of the lens barrel body.

13. A method of manufacturing an imaging lens unit, the method comprising:
preparing a lens barrel body that
 has a cylindrical shape, and
 includes three or more protrusions, defined as a plurality of lens receiving parts, on an inner surface of the lens barrel body, each of the plurality of lens receiving parts including a first surface and a second surface different from the first surface,
making a fixed lens contact with the plurality of lens receiving parts, wherein the fixed lens has a diameter larger than a diameter of an imaginary circle passing through the first surfaces in the plurality of lens receiving parts; and
press-fitting the fixed lens in parallel with a central axis of the lens barrel body to engage with the plurality of lens receiving parts by
 making an outer peripheral surface of the fixed lens contact with the first surface of each of the plurality of lens receiving parts, and
 making a plane surface of the fixed lens contact with the second surface of each of the plurality of lens receiving parts, wherein
the lens barrel body is deformed upon engagement of the fixed lens with the plurality of lens receiving parts,
the lens barrel body includes a plurality of thin parts and a plurality of thick parts arranged alternately in the circumferential direction of the lens barrel body,
each of the plurality of thin parts has a first radial thickness,
each of the plurality of thick parts has a second radial thickness larger than the first radial thickness,
upon the engagement of the fixed lens with the plurality of lens receiving parts, the plurality of thick parts is displaced outward and the plurality of thin parts is deformed,
upon the engagement of the fixed lens with the plurality of lens receiving parts, the plurality of thick parts is displaced outward in a radial direction of the lens barrel body,
each of the plurality of thin parts has an arc shape, and
upon the engagement of the fixed lens with the plurality of lens receiving parts, a radius of curvature of the plurality of thin parts before the fixed lens is engaged with the plurality of lens receiving parts becomes larger becomes larger.

14. The imaging lens unit according to claim 1, wherein the fixed lens has a diameter larger than a diameter of an imaginary circle passing through the first surfaces of the plurality of lens receiving parts before the fixed lens is engaged with the plurality of lens receiving parts, and
a difference between the diameter of the fixed lens and the diameter of the imaginary circle is absorbed by deformation of the plurality of thin parts upon the engagement of the fixed lens with the plurality of lens receiving parts.

* * * * *